(12) United States Patent
Malnati

(10) Patent No.: US 8,832,654 B2
(45) Date of Patent: Sep. 9, 2014

(54) SYSTEM AND METHOD FOR AUTONOMOUS GENERATION OF SOFTWARE DOCUMENTATION

(75) Inventor: James Malnati, Stillwater, MN (US)

(73) Assignee: Unisys Corporation, Blue Bell, PA (US)

( * ) Notice: Subject to any disclaimer, the term of this patent is extended or adjusted under 35 U.S.C. 154(b) by 385 days.

(21) Appl. No.: 12/815,530

(22) Filed: Jun. 15, 2010

(65) Prior Publication Data

US 2011/0307863 A1 Dec. 15, 2011

(51) Int. Cl.
*G06F 9/44* (2006.01)
*H04L 12/24* (2006.01)

(52) U.S. Cl.
CPC ......... *H04L 41/0681* (2013.01); *H04L 41/0233* (2013.01)
USPC ............ 717/123; 717/101; 717/106; 717/121

(58) Field of Classification Search
CPC ............... G06F 8/20; G06F 8/30; G06F 8/71; G06F 8/73
See application file for complete search history.

(56) References Cited

U.S. PATENT DOCUMENTS

| | | | |
|---|---|---|---|
| 7,302,674 B1 * | 11/2007 | Gladieux et al. | 717/101 |
| 7,404,177 B1 * | 7/2008 | Greenfield et al. | 717/106 |
| 7,565,643 B1 * | 7/2009 | Sweet et al. | 717/121 |
| 7,657,866 B2 * | 2/2010 | Cope et al. | 717/101 |
| 7,913,228 B2 * | 3/2011 | Ericsson et al. | 717/123 |
| 2011/0307863 A1 * | 12/2011 | Malnati | 717/123 |

OTHER PUBLICATIONS

Unisys Corporation, ClearPath Enterprise Servers—Operations Sentinel Autoaction Message System Administration Guide, Sep. 2008, 276 pages, <public.support.unisys.com/spo/docs2/os-11.2/78626900-006.pdf>.*
Single Point Operations Interface Software for ClearPath MCP, Unisys Corp., Jan. 2005, 50 pages.*
Linda K. Moore, The Emergency Alert System (EAS) and All-Hazard Warnings, Dec. 2010, 14 pages.*

* cited by examiner

*Primary Examiner* — Thuy Dao
(74) *Attorney, Agent, or Firm* — Richard J. Gregson

(57) ABSTRACT

The disclosure relates generally to autonomous generation of software documentation, and more specifically to autonomous generation of documentation that describes user-defined rules implemented for a computer management system. In one embodiment, a system for generating documentation comprises a database storing user-defined rules that specify management actions to be triggered, for managing a computer system, responsive to receipt of a system message from the managed computer system. The system further comprises a documentation generation device configured to autonomously generate documentation describing the rules, wherein the documentation contains identification of at least the system message and the corresponding management actions triggered by the rules upon receipt of the system message. In certain embodiments, the system further comprises a database utility device configured to generate a highly-structured representation of the user-defined rules from an autoaction database, and the documentation generation device processes the highly-structured representation to autonomously generate the documentation.

17 Claims, 4 Drawing Sheets

SYSTEM AND METHOD FOR AUTONOMOUS GENERATION OF SOFTWARE DOCUMENTATION

CROSS-REFERENCE TO RELATED APPLICATIONS

The following co-pending and commonly-assigned patent applications have at least some subject matter in common with the current application, all of which are hereby incorporated herein by reference: U.S. patent application Ser. No. 12/644,517 titled "Systems, methods, and computer program products for managing object alerts," and U.S. patent application Ser. No. 12/637,928 titled "Method, apparatus, and computer program product for generating audible alerts."

TECHNICAL FIELD

The below description relates generally to autonomous generation of software documentation, and more specifically to autonomous generation of documentation describing user-defined automated action(s) to be performed by a computer system management application.

BACKGROUND

Various types of software applications exist, and it is generally considered a favored practice to have some form of documentation that describes the operations that will be performed by the software application. Without such accompanying documentation, one is left to review the underlying code (e.g., the software code that is written in some programming language) to decipher the operations that will be performed during the application's execution. Often, it is difficult and/or inefficient to review the underlying software code, and thus it is often difficult to gain a good understanding of the application's operations from a mere review of the underlying code. In addition, the underlying code may change from time to time (e.g., as new versions of the software application are developed), and so further difficulty and inefficiency arise in attempting to understand the application's operations at a given time. In addition, an understanding of the software application's operations based solely on a review of the underlying software code may only be achieved by persons (e.g., programmers) who are knowledgeable about the programming language in which the application's code is written, and thus many users of the software application and/or other interested parties who are not knowledgeable about the programming language are unable to gain an understanding of the software application's operations in this manner.

Accordingly, documentation is often created for describing the operations of a software application. The documentation may be written in a manner that is more readily understood by persons who are unfamiliar with the programming language in which the software application is coded. In addition, the documentation may provide a more efficient way to gain an understanding of the application's operations than reviewing the application's underlying code, even for persons who are familiar with the programming language in which the underlying code is written. The documentation may describe, for example, what operations the software application may perform in response to certain conditions that it may encounter during its execution.

Conventionally, the documentation for a software application is manually written, e.g., by the software developers and/or by technical writers working under the direction of or in correspondence with the software developers.

One type of software application for which generation and maintenance of corresponding documentation is particularly problematic is that referred to herein as a computer system "management application," which refers generally to software applications that monitor, control, and/or otherwise manage the operation of computer systems. Computer systems (e.g., information technology systems) are essential to any modern business. These systems have and continue to grow increasingly more complex. For instance, such systems may include distributed centers located anywhere from a few miles apart to those across the continent or in separate countries. Today, personal computers are common and many businesses employ multiple operating systems from various vendors. Often, systems of a company are dispersed in branch offices running critical applications or containing essential data. One exemplary type of computer system management application is that referred to as a Single Point Operations software, which supports centralized control and automated operations of multiple data processing systems.

Tools, such as management applications, are available that integrate operational control of multiple heterogeneous mainframes and distributed systems. These systems include numerous components that need to be managed. Typically, managed objects are used to view, monitor, and manage these components. The managed objects are typically predefined in operational software (e.g., in a management application) for managing the components of the system. For instance, such systems may employ filters that compare managed objects to a property threshold, whereby an alert is raised on a managed object when a property of the object satisfies the threshold.

Many computer system management applications allow users to define rules and corresponding actions that the application is to automatically trigger upon the conditions that it monitors satisfying the defined rules. For instance, a management application may allow a user to define one or more message-matching rules that specify certain messages that the management application receives/detects (e.g., system messages generated by one or more monitored computer systems), and the rules may further specify one or more actions that are to be triggered by the management application upon such a message match.

As an example, Single Point Autoaction Message System (SP-AMS) software is an automation language contained in Operations Sentinel® by Unisys® Corporation. SP-AMS is a utility that allows a user to specify messages to match and actions to automatically perform (e.g., without operator interaction) when a message is received and matched. ClearPath Plus OS 2200 Autoaction Message System (CP-AMS) is also part of Operations Sentinel. SP-AMS automates system operations for MCP and UNIX systems and partitions; and CP-AMS automates system operations for OS 2200 partitions in a ClearPath Plus server.

Operations Sentinel uses a ClearPath (CP)-AMS autoaction database associated with each OS 2200 console and an SP-AMS autoaction database associated with managed UNIX, MCP, and Linux partitions, to identify system messages and automatically execute actions. These actions can include raising alerts that are displayed in the Alerts window of Operations Sentinel Console. In addition to displaying alerts, a user may create rules to activate external paging devices (or other communication/notification devices, such as mobile telephones, etc.) when an alert is raised, acknowledged, or cleared. Actions may also include cross-system commands sent to another managed system.

A primary function of SP-AMS is to parse console messages and respond to problems by taking command actions, raising alerts, and logging exceptions. These actions are specified within a proprietary automation language that is both easy to use and extend.

However, as user-defined automation rules grow, there is a desire to document such automated actions. As discussed above, conventionally developers are required to manually create and update documentation of the automated messages and the actions that result without operator interaction. This becomes particularly problematic in maintaining accurate and up-to-date documentation for user-defined rules that are implemented at any given time, which may vary how a computer system management application manages the managed system(s), such as what events trigger actions, what specific actions are triggered by various events, and so on. In the case of such user-defined rules, the rules that are defined and/or activated may vary from site to site. Thus, while the underlying management application that is installed at various sites may be the same, the rules that users define (e.g., for management of their respective managed systems) may vary, and thus merely documenting the operation of the underlying management application may fail to sufficiently capture/describe the management operations that are active at a given site.

SUMMARY

The above-described manual documentation process is tedious and error prone. In most cases this means it will not be accomplished with quality, and in many cases it will not be done at all, particularly with regard to user-defined rules. Thus, an autonomous documentation generation system and method is desirable.

Thus, this disclosure relates generally to autonomous generation of software documentation, and more specifically to autonomous generation of documentation that describes user-defined rules implemented for a computer management system. In one embodiment, a system for generating documentation comprises a database storing user-defined rules that specify management actions to be triggered, for managing a computer system, responsive to receipt of a system message from the managed computer system. The system further comprises a documentation generation device configured to autonomously generate documentation describing the rules, wherein the documentation contains identification of at least the system message and the corresponding management actions triggered by the rules upon receipt of the system message. In certain embodiments, the system further comprises a database utility device configured to generate a highly-structured representation of the user-defined rules from an autoaction database, and the documentation generation device processes the highly-structured representation to autonomously generate the documentation.

BRIEF DESCRIPTION OF THE DRAWINGS

For a more complete understanding of the present teachings, reference is now made to the following description taken in conjunction with the accompanying drawings.

DETAILED DESCRIPTION

Figure 1:
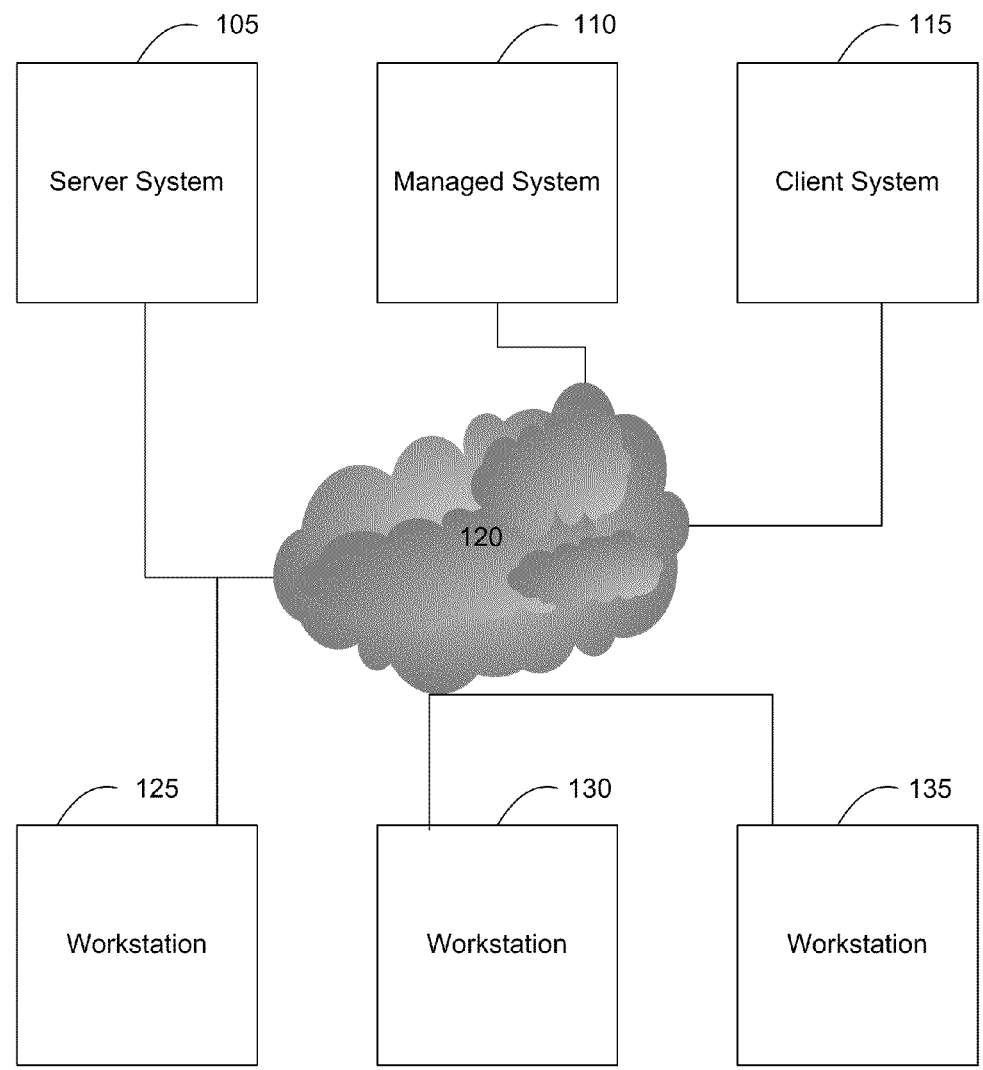
FIG. 1 is a block diagram of an operational system for managing a large computing distributed computing system adapted according to one example embodiment.

The word "exemplary" is used herein to mean "serving as an example, instance, or illustration." Any embodiment described herein as "exemplary" is not necessarily to be construed as preferred or advantageous over other embodiments.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to autonomous generation of software documentation, particularly for a computer system management application that supports automated actions to perform responsive to occurrence of some predefined event. The management application may allow a user to define rules that govern the performance of certain automated actions. For instance, the user-defined rules may specify system messages to match and actions to perform when a message is received and matched. The management application may, in certain embodiments, be a single point operations software application that enables centralized management (and/or control) and automated operations of multiple data processing systems. In certain embodiments, as described further below, the user-defined rules are contained in an autoaction database that is supported by the management system.

An exemplary management application with which certain embodiments of the present disclosure may be employed for autonomous software documentation includes, without limitation, the Operations Sentinel® by Unisys® Corporation. For more information about Operations Sentinel®, see e.g., ClearPath Enterprise Servers: Operations Sentinel Administration and Configuration Guide, Operations Sentinel Level 11.0, September 2008 (7862 2321-010), the disclosure of which is hereby incorporated herein by reference.

Further, exemplary managed computer systems and management applications with which certain embodiments of the present disclosure may be employed for autonomous software documentation include, without limitation, those described in U.S. Pat. No. 6,154,787 titled "Grouping shared resources into one or more pools and automatically re-assigning shared resources from where they are not currently needed to where they are needed," U.S. Pat. No. 7,092,940 titled "Automation of complex user-level command sequences for computing arrangements," U.S. Pat. No. 7,421,492 titled "Control arrangement for operating multiple computer systems," U.S. Pat. No. 7,513,027 titled "Operator messaging within an environment for operating multiple computing systems," co-pending U.S. patent application Ser.

No. 12/644,517 titled "Systems, methods, and computer program products for managing object alerts," and co-pending U.S. patent application Ser. No. 12/637,928 titled "Method, apparatus, and computer program product for generating audible alerts," the disclosures of which are hereby incorporated herein by reference.

In certain embodiments, the management application may employ object-oriented programming for managing various components of the computing system as managed objects. Object-oriented programming uses primarily classes and objects. A class creates a new type where objects are instances of the class. Objects can store data using ordinary variables that belong to the object. Variables that belong to an object or class are called fields. Objects can also have functionality by using functions that belong to a class. Such functions are called methods of the class. Collectively, the fields and methods can be referred to as the attributes of that class. Fields can belong to each object of the class or they can belong to the class itself.

Classes are created in the source code itself by using the class statement followed by the name of the class. An object of the class can then be created. Class variables are shared by all objects of that class. There is only one copy of the class variable, and when an object makes a change to a class variable, the change is reflected in all other objects as well. Object variables are owned by each object and are not shared. Subclasses can also be used that inherit the properties of the parent class, but can also have additional defined properties. Instance is the name of a single managed object associated with an actual system on the network.

The management application may generate alerts based on object states. An example alert might be that a disk drive, an object of the managed system, is close to full. An alert can be sent via an alert event report that requires the recipient of the report to be identified in Class and Instance properties of the event report.

FIG. 1 is a block diagram of an operational system for managing a large distributed computing system 100. The system 100 includes a server system 105, a managed system 110, computer workstations 125, 130, 135, and a client system 115, as is well known in the art. The server system 105, managed system 110, computer workstations 125, 130, 135 and the client system 115 preferably communicate with one another over a network 120, which can be any suitable network such as a LAN, WAN, or any other network.

In one exemplary embodiment, the server system 105 acts as a maintenance processing system and/or a utility monitoring processing system that functions to monitor the activities and health of the components, processes, and tasks executing within the managed system 110. The managed system 110 performs the processing desired by the operators of the managed system 110. Client system 115 includes processing systems utilized by operators of the managed system 110 to view operations, maintenance and health information regarding the components, processes and tasks in the managed system 110. Furthermore, any one or more of the computer workstations 125, 130, and 135 may include processing systems utilized by operators of the managed system 110 to view operations, maintenance and health information regarding the components, processes and tasks in the managed system 110. In some embodiments, the client system 115 may, itself, be a computer workstation that is a peer of the workstations 125, 130, 135. In the embodiment shown in FIG. 1, these systems are shown to be separate processing systems. One of ordinary skill in the art will recognize that these systems may be implemented to operate on one as well as numerous hardware systems without deviating from the spirit and scope of the present invention as recited within the attached claims.

In one example embodiment, Operations Sentinel® by Unisys® provides an operational environment for managing large computing systems, such as the computing system 100. Operations Sentinel® includes a Graphical User Interface (GUI) for managing alerts in the computing system. Specifically, Operations Sentinel® provides visual and/or audible alerts at the server system 105. Additionally or alternatively, one or more of the server system 105, the client system 115, and the computer workstations 125, 130, 135 includes a utility for generating visual and/or audible alerts of system conditions. It may also be the case that some alerts are directed to certain ones of the workstations and not to others. In addition, a GUI is provided in some embodiments so that commands may be sent to portions of the system generating the alert without the overhead of starting the Operations Sentinel® GUI at the server system 105 or the actual system console. Use of commands may be restricted on some ones of the workstations 125, 130, 135 according to established user permission. While reference is made to Operations Sentinel®, it is understood that various embodiments are applicable to any monitoring system for a distributed computing system.

An exemplary management application with which certain embodiments of the present disclosure may be employed for autonomous software documentation includes, without limitation, the Operations Sentinel® by Unisys® Corporation. The Operations Sentinel and its SP-AMS, CP-AMS and autoaction databases with which embodiments of the present disclosure may be implemented are discussed below to aid the reader in understanding one exemplary environment in which the autonomous generation of software documentation may be implemented. Further information regarding Operations Sentinel and its SP-AMS, CP-AMS and autoaction databases can be found in ClearPath Enterprise Servers: Operations Sentinel Administration and Configuration Guide, Operations Sentinel Level 11.0, September 2008 (7862 2321-010) and ClearPath Enterprise Servers: Operations Sentinel Autoaction Message System Administration Guide, Operations Sentinel Level 11.0, September 2008 (7862 6900-006), the disclosures of which are incorporated herein by reference. Of course, while the below-described implementation contains details that are specific to Operations Sentinel and its SP-AMS, CP-AMS and autoaction databases, embodiments of the present disclosure are not so limited in application, but may be readily adapted for implementation with other computer management applications and autoaction databases that contain user-defined rules, as those of ordinary skill in the art will appreciate.

Figure 2:
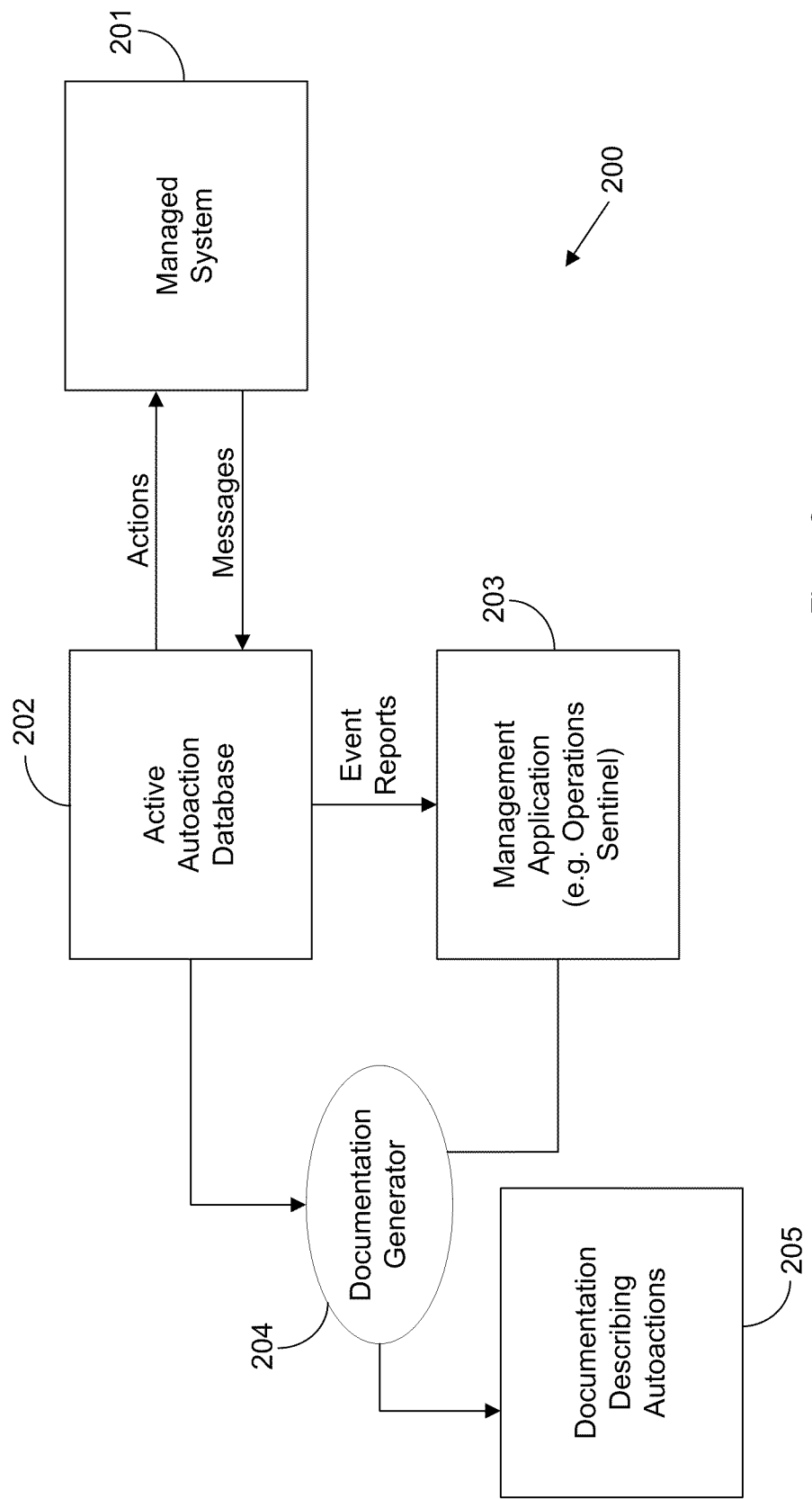
FIG. 2 shows a block diagram of a managed system in which user-defined rules stored to an autoaction database are used for managing the system, and wherein documentation for such rules is autonomously generated in accordance with one embodiment of the present disclosure.

A block diagram illustrating one exemplary embodiment for autonomously generating documentation according to the present disclosure is shown in FIG. 2. FIG. 2 shows a system 200 that includes a managed computing system 201, an active autoaction database 202, and a management application (e.g., Operations Sentinel) 203. As described further herein, the autoaction database 202 may include user-defined rules that responsive to receive messages from the managed system 201 triggers corresponding autoactions (e.g., autonomous actions that are triggered without requiring user interaction). Exemplary autoaction databases include the below-described SP-AMS and CP-AMS autoaction databases, and exemplary actions that may be triggered include those described further herein for the SP-AMS and CP-AMS autoaction databases.

In accordance with embodiments of the present disclosure, the system 200 further includes a documentation generator 204 that is operable to autonomously generate documentation 205 that describes the autoactions contained in autoaction database 202. The documentation generator 204 is said to "autonomously" generate the documentation because it does not require a user to manually create the descriptive documentation 205. Documentation generator 204 may be a software application (that contains computer-executable software code stored to a computer-readable medium and executing on a processor-based device) for performing the operations (e.g., as described further herein) for generating the documentation 205.

According to one exemplary embodiment, an autoaction database 202 contains a series of patterns. Each pattern includes message-matching criteria that are used to match messages from managed systems, and actions that are automatically executed when the pattern matches a system message. A user of the computer system management application (e.g., user of SP-AMS in Operations Sentinel) can create any number of autoaction databases, any of which may be designated as being active at a given time for matching messages for a managed system.

The active SP-AMS database matches messages from all MCP and UNIX systems that Operations Sentinel is managing. A different active CP-AMS database for each OS 2200 console of a ClearPath Plus server matches messages sent to that OS 2200 console by the OS 2200 partition.

AMS includes the Autoaction Database Manager (ADBM) to develop and maintain autoaction databases. A user can also use command prompt utilities—Build Autoaction Database (BADB), Dump Autoaction Database (DADB), Verify Autoaction Database (VADB), and Distribute—to create, update, dump, test, and distribute autoaction databases.

Some of the terminology commonly used with AMS is now briefly described.

Patterns. Patterns form the basis of an autoaction database. Each pattern specifies the messages that the user wants to match and can include autoactions that are performed when the pattern matches a message.

Message-Matching Criteria. Message-match criteria are the part of a pattern that describes the message or messages that a user wants to match. They identify the important parts of the message and constraints, such as message length, that must be satisfied for the message to match the pattern.

Autoactions. Autoactions provide the automation of managed hosts. By specifying autoactions, a user can automate operations in response to system messages. When AMS receives a message and matches it to a pattern in the active database, any actions defined in the matched pattern are automatically executed.

Variables. Variables provide a means for AMS to store information from system messages, which can be used for Matching patterns to later messages;

Conditionally executing autoactions;

Building action text.

Expressions. Expressions provide additional capabilities in an autoaction database. A user can use them to constrain pattern matching to conditions specified in the message-match criteria, and to add conditional logic to the execution of autoactions.

Various autoactions may be implemented in such a user-defined autoaction database that is used by a managed application for managing computer system(s). A user can include autoactions in patterns. The autoactions in a pattern are executed when the pattern matches a message.

Various types of autoactions may be implemented. For instance, the following autoactions can be included in both SP-AMS and CP-AMS databases:

Activating or deactivating a database;

Sending an unsolicited command to the host system that sent the matched message;

Sending an event report for processing by Operations Sentinel;

Changing the value of a variable defined in the database;

Executing any of the above actions only when conditions defined in the pattern are true.

The CP-AMS of Operations Sentinel allows these additional autoactions:

Sending a response to a read-and-reply message;

Generating a console alarm;

Highlighting specific messages;

Inserting or deleting a message from the Hold pane;

Suppressing specific messages;

Adding supplemental text to a message;

Executing a macro.

A user can define multiple databases to be activated for different times of the day or for different system conditions. The user can define a pattern within a database to match a system message and include an autoaction in the pattern that deactivates the current database and/or activates another one.

An autoaction may be defined to send an unsolicited command to the managed system (or "host"). For instance, a user may define an autoaction to send a command back to the managed host when a message from that host matches the pattern containing the action. The user can define an autoaction to send a response to a system message or operating system command. In SP-AMS, the user can also define an autoaction to send a command that invokes a shell script. In all cases, the managed system receives the command as if the operator had entered it.

The user may define an autoaction that sends an event report. For instance, the user may use such an event report to:

Raise, clear, or acknowledge an alert in Operations Sentinel;

Change the value of an attribute of a managed object in Operations Sentinel Console;

Delete a managed object from Operations Sentinel Console;

Log a report of a system event in an Operations Sentinel log file;

Send a command to any system managed by Operations Sentinel.

The user may define actions that change the values of user-defined variables and of the members of variable groups. The user can use these variables in the text of other actions, in expressions, and in conditional logic constructions. The user may use variables to store information from previous messages and provide more flexibility, resulting in an autoaction database with more capabilities.

Using conditional logic in an autoaction database, the user can define autoactions to be executed only when conditions that the user specifies are true. The user can also define autoactions to be executed only when conditions the user specifies are not true. The user can use conditional logic and variables to match similar but different messages using the same pattern, thereby increasing the efficiency of the database.

The user may define an autoaction that sends a response to a read-and-reply message. Optionally, the user may define that the response is to be delayed until another console message is received.

The user may define an autoaction that generates an alarm for the console. The alarm may be sent to all OS 2200 Console Views connected to the console. How the alarm appears and/or sounds depends on the OS 2200 Console View alarm configuration. The alarm also causes an alert to be sent to Operations Sentinel causing it to be displayed in Operations Sentinel Console.

The user may define an autoaction that inserts or deletes a message from the OS 2200 Console View Hold pane. The user may define an autoaction to suppress a console message from the OS 2200 Console View Traffic pane and Hold pane.

The user may define an autoaction to display additional messages in the OS 2200 Console View Traffic pane and Hold pane. These messages can also be written to the Operations Sentinel log file for the partition.

The user may define an autoaction to execute an OS 2200 Console View macro as if the operator had entered it. Such a macro may be a sequence of OS 2200 keyins (commands) that are sent to the OS 2200 partition. The user may also suppress the echo of the OS 2200 keyins in the OS 2200 Console View Traffic pane.

Figure 3:
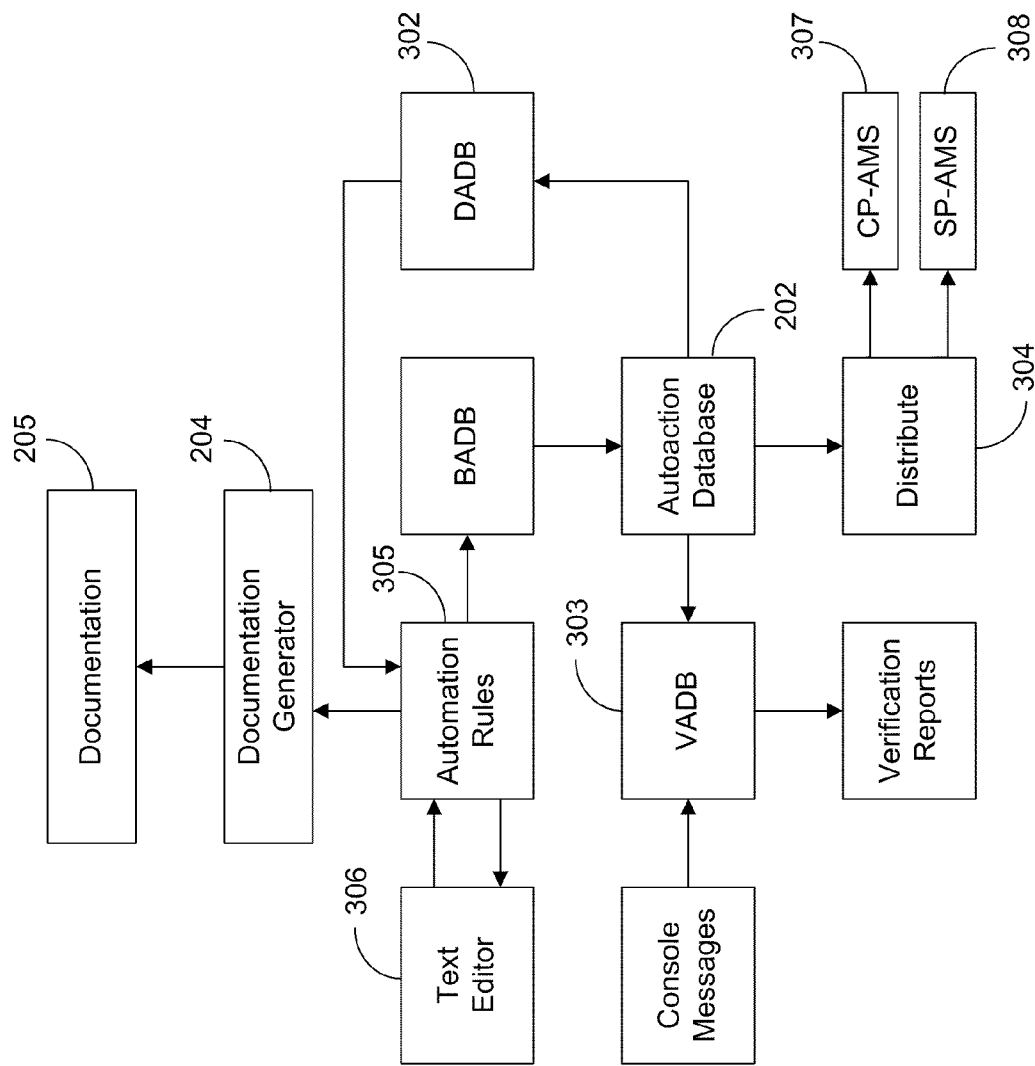
FIG. 3 shows exemplary autoaction database utilities that may be implemented in accordance with embodiments of the present disclosure.

Various exemplary autoaction database utilities that may be implemented in accordance with embodiments of the present disclosure are shown in FIG. 3. An Autoaction Database Manager (ADBM) may be included, which provides an integrated environment for developing, maintaining, and testing autoaction databases. Each database may be maintained as a project within a workspace. ADBM may also allow a user to distribute autoaction databases to other Operations Sentinel servers. In addition to this integrated utility, the user may also use the following four command-line utilities included with Operations Sentinel: Build Autoaction Database (BADB) 301, Dump Autoaction Database (DADB) 302, Verify Autoaction Database (VADB) 303, and Distribute utility 304, which are discussed further below.

The user may use the Build Autoaction Database (BADB) utility 301 to produce an output file of the user-defined database 202 that AMS can use at run time. The input to the BADB utility 301 is one or more text files containing BADB syntax specifying user-defined automation rules 305. A user may use text editor 306 to define such automation rules 305.

If the user no longer has the text source 305 of a user-defined autoaction database 202, the Dump Autoaction Database (DADB) utility 302 may be used to produce the source file 3-5. The input to the DADB utility 302 is a run-time autoaction database 202. The DADB 302, as well as the various other utilities/components 301-308 are described further in ClearPath Enterprise Servers: Operations Sentinel Autoaction Message System Administration Guide, Operations Sentinel Level 11.0, September 2008 (7862 6900-006), the disclosure of which is hereby incorporated herein by reference.

The user may use the Verify Autoaction Database (VADB) utility 303 to verify the pattern-matching and action generation capabilities of an autoaction database 202. For example, VADB 303 can identify conflicting pattern-matching rules within a database containing multiple patterns that match a single message.

The user may use the Distribute utility 304 to install, update, and restore autoaction databases 202 to Operations Sentinel servers, such as to CP-AMS servers 307 and/or to SP-AMS servers 308.

In accordance with this exemplary embodiment of the present disclosure, the system further includes a documentation generator 204 that is operable to autonomously generate documentation 205 that describes the autoactions (e.g., automation rules 305) contained in autoaction database 202. The documentation generator 204 may receive as input the automation rules 305, which may be constructed by DADB utility 302 as discussed above, and processes the received automation rules file 305 to generate documentation 205 that describes such automation rules that are in place for a given autoaction database 202. A specific example of automation rules 305 that may be processed by documentation generator 204 to generate documentation 205 is described further below.

First, however, exemplary syntax rules that may be used by a user for defining automation rules 305 in accordance with one embodiment are described. The exemplary syntax rules that are supported by Operations Sentinel are described below for illustrative purposes and to provide a real example that may be expanded upon in describing an exemplary application of an embodiment of documentation generator 204 thereafter. Of course, the scope of the present disclosure is not limited to the specific syntax provided herein, but may be readily adapted to any other syntax that may be employed for defining automation rules 305.

The commands recognized by ADBM and BADB in one exemplary embodiment are composed of a command name followed by one or more parameters. The user can specify these parameters in any order, but separates them by spaces or commas. The user can include more than one command per line, separated by one or more spaces.

The user can specify a command that spans multiple lines by inserting a space and a backslash (\) as continuation characters at the end of each line prior to the last line. Any characters the user specifies after a space and a backslash are ignored.

The user can specify a quoted string that spans multiple lines; however, the user must enclose all string segments in quotes and cannot split a string between the two backslashes each used to designate masking or action substitution.

The user can insert a comment anywhere a space is valid. The user cannot insert a comment within a quoted string or within a delimiter set. Comments begin with /* and end with */, as in the following example: /* This is a comment */

In certain embodiments, the comments are not saved in the run-time autoaction database 202, and subsequently do not appear if the user process the autoaction database 202 with DADB 302. Of course, in other embodiments, the comments may be so included such that an automation rules file 305 generated by DADB 302 includes the comments, which may then be used by documentation generator 204 for generating documentation 205. Of course, as discussed further herein, documentation generator 204 is not reliant upon any such comments being included in order to generate documentation 205.

Various commands can be employed in creating the automation rules 305. Exemplary commands that may be used in defining an automation rule include ALL, CONSTRAINT, ELSEIF, END, ENDIF, IF, PRIVILEGED-EXEC, RESET, and SET. The operation of these commands within the Operations Sentinel autoaction databases are well-known in the art.

Patterns consist of several commands, each of which has a required layout, as in this exemplary embodiment:

```
DEFINE "group-name" [pattern-number]
MESSAGE "message-text"
[TYPE [message-type] [sender-type] [TEST] [VARIABLE-LENGTH] ]
[PRIORITY integer]
[INSTANCE [instance-type]]
[DELIMITERS delimiter-spec]
[TOKEN [token-type] integer ["token-text"] ] ...
[CONSTRAINT expression] ...
[action command] ...
{END | OMIT}
```

Since user-defined automation rules 305 may vary from time to time, it becomes particularly desirable to efficiently and accurately generate documentation 205 describing those rules. In this way, persons (e.g., including those who are not familiar with the syntax used for defining the rules) may readily gain an understanding of how the managed system(s) are being managed (e.g., the management actions triggered by various events, such as by various system messages, etc.) from the documentation 205. The documentation 205 may be produced in a spreadsheet (e.g., Microsoft Excel, etc.), word processing document (e.g., Word-based document, etc.), or in other textual and/or graphical form.

As discussed above, automation rules 305 may be defined by a user that specify various actions to be triggered based upon specified message matching occurring. Typically, there is a need to identify the message to be matched, the variables involved in any decision-making, and the actions taken by SP-AMS on the actual systems. With this information, the Operations staff can say with certainty that "if this message appears on the system console, this action will occur". Crucially, the users (e.g., Operations staff) will not require any knowledge of programming in general or the SP-AMS language in particular in order to gain an understanding from the documentation 205 of the actions that have been defined to occur for various messages (as specified by the automation rules 305). Indeed, the electronic output of the documentation 205 may be generated and/or queried on an ad-hoc basis in real-time. This means that operational decisions based on user-defined automated actions may be made quickly and with certainty.

Unstructured source code often looks like the following, due to the flexibility of the SP-AMS language parser:

```
def "msmonitor"
mes "Fixed tracks available = x Panic threshold = y"
type variable
tok run "msmon\*1\" tok fix 1 tok fix 2 tok key 3
act all high "green"
act all corn "st RmTemp"
act all hold
act all event
"type=al|class=host|instance=$HOST$|sev=informational|appl=ms|alert
id=\1\|text=\5\ \1\ \2\ \3\"
end
```

Fortunately, the SP-AMS language is sufficiently structured to make automated analysis possible. This does not mean that proper conventions will necessarily be adhered to by the authors of the automation rules code 305 (e.g., when drafting them via text editor 306), but here again the SP-AMS user is fortunate. The above-mentioned post-processor, DADB 302, is a component of the supported product in one embodiment. Its function is to dump the built machine-readable code into the highly structured symbolic output that provides a consistently structured presentation of the automation rules 305 that is expected for processing by the documentation generator 204. DADB 302 may also fill in programming language defaults and may also place language constructs in predictable order. This means that the further post-processor (i.e., the documentation generator 204) may complete the process and produce automated documentation 205 from machine-readable automation binaries.

Highly structured output of the DADB processor 302 may produce the following automation rules 305 (same code after automated reformatting) from autoaction database 202:

```
/* Patterns for group "msmonitor" */
DEFINE "msmonitor" I
MESSAGE "Fixed tracks available = x Panic threshold = y"
/*___1__*__2__*____3____*4*5*__6__*____7____*8*9 */
TYPE PRIVILEGED-EXEC OTHER VARIABLE-LENGTH
INSTANCE PRIMARY
PRIORITY 128
TOKEN KEYWORD 3 "AVAILABLE"
TOKEN FIXED 2 "TRACKS"
TOKEN FIXED 1 "FIXED"
TOKEN RUNID "MSMON\*1\"
ACTION ALL HIGHLIGHT "GREEN"
ACTION ALL HOLD
ACTION ALL COMMAND "st RmTemp"
ACTION ALL EVENT-REPORT \
"TYPE=al|CLASS=host|INSTANCE=$HOST$|sev=informational|appl=ms|" \
    "alertid=\_TOKEN1\|text=
    \_TOKEN5\ \_TOKEN1\ \_TOKEN2\ \_TOKEN3\"
END
```

While the above is clearly an improvement, it is still too detailed and technical for most operators. What is desired at a growing number of customer sites is documentation that is readable and readable understandable by the highest levels of management and the lowest-level operator. An example of such descriptive documentation, which may be included in documentation 205 that is generated by documentation generator 204 by processing the above automation rules (which may have been generated by DADB 302), is as follows:

Console Message:
Fixed tracks available=x Panic threshold=y
Associated Actions:
1. Alert raised with the following attributes:
   a. Alert-Id is "Fixed" which triggers a text message and email to Tech Support.
   b. Alert text: "x Fixed tracks available"
2. Command action: Job RmTemp started.
3. Console message highlighted in green and held onscreen.

The exemplary documentation provided above clearly identifies the console message to which the rule pertains (e.g., which when encountered will invoke the actions), which in the above example is the message "Fixed tracks available=x Panic threshold=y." The exemplary documentation provided above also clearly identifies the corresponding actions that will be triggered upon occurrence of the message, which in the above example are the three actions listed.

The documentation generator 204 looks for certain keywords in the highly-structured automation rules 305, such as "MESSAGE" and "ACTION" and then uses the information that follows those keywords in the automation rules 305 to translate the messages and actions into a more understandable textual description that is arranged under the "Console Message" and "Associated Actions" headings within the generated documentation 205. For example, when "ACTION ALL EVENT-REPORT" is encountered with "TYPE=AL" and severity is anything other than "clear" we know an alert is being raised and the "TEXT=<text of the alert" attribute contains the information to be imparted by the alert. These are examples of what the present disclosure looks for to define the action and the text of the alert that needs to be documented.

Again, the above documentation 205 may be available in any of a variety of viewing formats (Microsoft Word and Excel are just two examples) and could even be represented as a UML diagram for sites that desire a graphical view of the automated actions. Importantly, the matched messages and subsequent actions are documented in a manner that is conducive to Operations personnel understanding within any given organization.

Operators can also cut/paste console message(s) from a log file into a user interface of the documentation generator for querying for documentation 205 that describes specific rules pertaining to the input message(s) in an ad-hoc fashion, further improving automation transparency. Also note that the alert raised in the above-described example was flagged as having sent a text message and email to "Tech Support." This was determined by automated parsing of the Alert Policy (a separate component that handles external actions). This illustrates another feature of one embodiment, which is the ability of the documentation generator 204 to tie together separate components that would otherwise not be documented.

Figure 4:
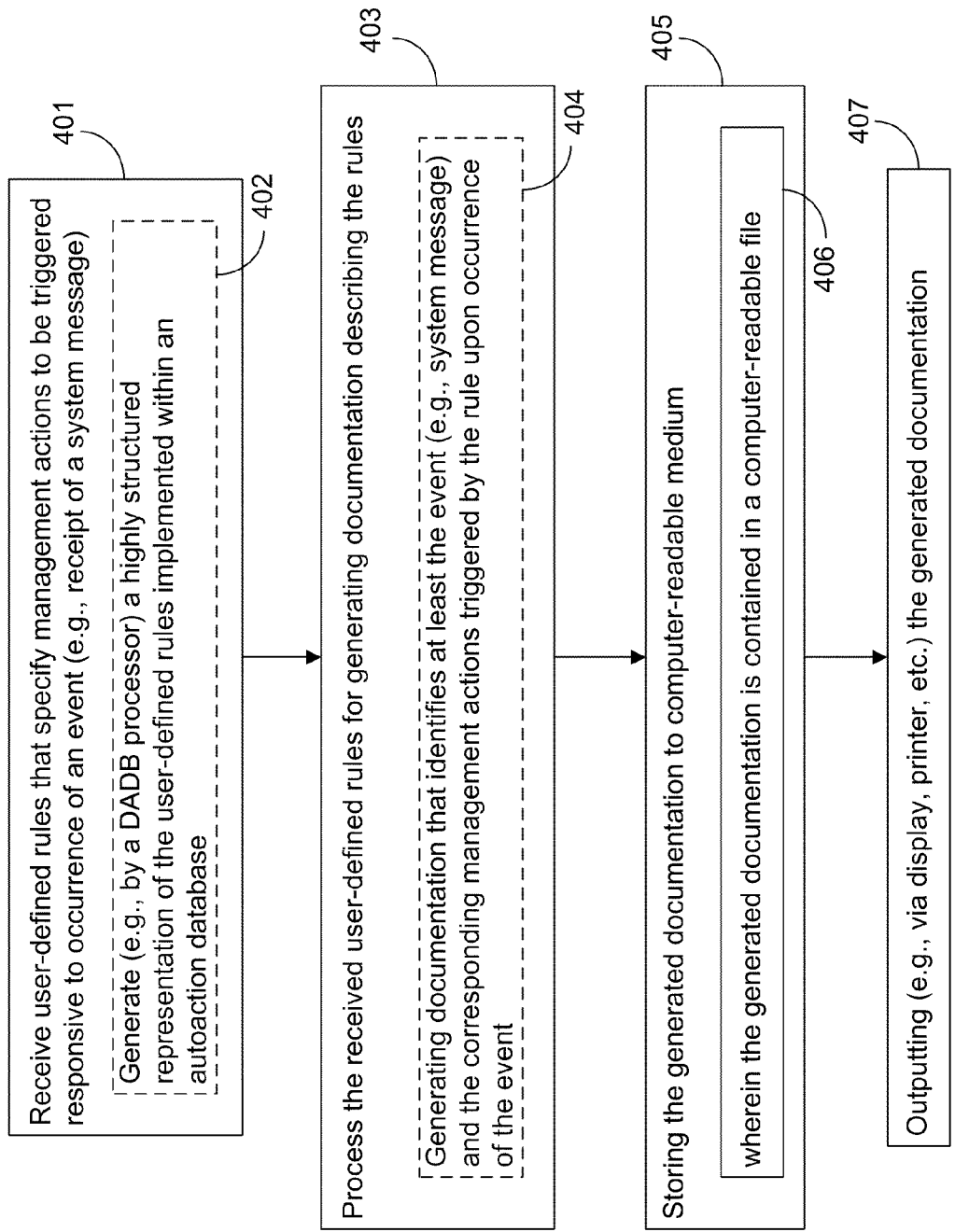
FIG. 4 shows an exemplary operational flow diagram according to one embodiment of the present disclosure.

FIG. 4 shows an exemplary operational flow diagram for one embodiment of the present disclosure. As shown, user-defined rules (e.g., automation rules 305 of FIG. 3) are received by documentation generator 204 in operational block 401. The user-defined rules specify management actions to be triggered responsive to occurrence of an event, such as receipt of a particular system message, as discussed above. As discussed above with FIG. 3, in certain embodiments, a highly-structured representation of the user-defined rules may be generated (e.g., by DADB processor 302 of FIG. 3) from an autoaction database (e.g., database 202 of FIG. 3), as shown in optional sub-block 402.

In operational block 403, the documentation generator 204 processes the received user-defined rules (e.g., as described above) for generating documentation describing the rules. For instance, as shown in optional sub-block 404, the documentation may identify at least the event (e.g., a system message) to which the rule pertains and the corresponding management action(s) that are triggered by the rule upon occurrence of the event.

In operational block 405, the generated documentation is stored to a computer-readable medium. The generated documentation may be a computer-readable file, such as a Word or Excel file as examples, as shown in sub-block 406. In operational block 407, the generated documentation may be output (e.g., presented on a display of a user's computer, printed via a printer, etc.). As discussed above, the output documentation may be reviewed to gain an understanding of the management actions in place for a given computer system(s).

It is recognized that the above systems and methods operate using computer hardware and software in any of a variety of configurations. Such configurations can include computing devices, which generally include a processing device, one or more computer readable media, and a communication device. Other embodiments of a computing device are possible as well. For example, a computing device can include a user interface, an operating system, and one or more software applications. Several exemplary computing devices include a personal computer (PC), a laptop computer, or a personal digital assistant (PDA). A computing device can also include one or more servers, one or more mass storage databases, and/or other resources.

A processing device is a device that processes a set of instructions. Several examples of a processing device include a microprocessor, a central processing unit, a microcontroller, a field programmable gate array, and others. Further, processing devices may be of any general variety such as reduced instruction set computing devices, complex instruction set computing devices, or specially designed processing devices such as an application-specific integrated circuit device.

Computer-readable media includes volatile memory and non-volatile memory and can be implemented in any method or technology for the storage of information such as computer-readable instructions, data structures, program modules, or other data. In certain embodiments, computer-readable media is integrated as part of the processing device. In other embodiments, computer-readable media is separate from or in addition to that of the processing device. Further, in general, computer-readable media can be removable or non-removable. Several examples of computer-readable media include, RAM, ROM, EEPROM and other flash memory technologies, CD-ROM, digital versatile disks (DVD) or other optical storage devices, magnetic cassettes, magnetic tape, magnetic disk storage or other magnetic storage devices, or any other medium that can be used to store desired information and that can be accessed by a computing device. In other embodiments, computer-readable media can be configured as a mass storage database that can be used to store a structured collection of data accessible by a computing device.

A communications device establishes a data connection that allows a computing device to communicate with one or more other computing devices via any number of standard or specialized communication interfaces such as, for example, a universal serial bus (USB), 802.11a/b/g network, radio frequency, infrared, serial, or any other data connection. In general, the communication between one or more computing devices configured with one or more communication devices is accomplished via a network such as any of a number of wireless or hardwired WAN, LAN, SAN, Internet, or other packet-based or port-based communication networks.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein (such as that described in FIG. 4 above) may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In one or more exemplary designs, the functions described may be implemented in hardware, software, firmware, or any combination thereof. If implemented in software, the functions may be stored as one or more instructions or code on a computer-readable medium which are processed/executed by one or more processors.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for autonomously generating documentation describing user-defined rules for computer system management, the method comprising:
   receiving, a documentation generator device, user-defined rules that specify management actions to be triggered responsive to occurrence of an event for managing a computer system; and
   processing, by the documentation generator device, the received user-defined rules for generating documentation describing the rules;
   wherein the documentation generator device comprises an autoaction database containing patterns specifying messages desired to be identified and corresponding autoactions to be taken;
   wherein generating comprises generating documentation for:
      user defined rules comprising message matching criteria used in comparing patterns with messages; and
      the corresponding autoactions to be taken comprise raising alerts to a console associated with the computer management system, activating paging devices external to the computer management system, and generating cross-system commands that may be sent to another managed compute management system.

2. The method of claim 1 wherein said processing comprises:
   generating said documentation that contains identification of at least the event and the corresponding management actions triggered by the rule upon occurrence of the event.

3. The method of claim 1 further comprising:
   generating a highly-structured representation of the user-defined rules implemented within a database, wherein said receiving comprises receiving said highly-structured representation of the user-defined rules.

4. The method of claim 1 wherein the event comprises a system message from a managed computer system.

5. The method of claim 1 further comprising:
   storing the generated documentation to computer-readable medium.

6. The method of claim 5 wherein the generated documentation is contained in a computer-readable file.

7. The method of claim 1 further comprising:
   outputting the generated documentation.

8. The method of claim 1 wherein said documentation generator device comprises computer-executable software stored to a computer-readable medium that is executing on at least one processor for performing at least said processing.

9. A computer program product having a non-transitory computer-readable medium having computer program logic recorded thereon for autonomously generating documentation describing user-defined rules for computer system management, the computer program product comprising:
   code for receiving user-defined rules that specify management actions to be triggered responsive to occurrence of an event for managing a computer system; and
   code for generating, from processing of the received user-defined rules, documentation describing the rules;
   wherein the documentation generator device comprises an autoaction database containing patterns specifying messages desired to be identified and corresponding autoactions to be taken; and
   user defined rules comprising message matching criteria used in comparing patterns with messages; and
   the corresponding autoactions to be taken comprise raising alerts to a console associated with the computer management system, activating paging devices external to the computer management system, and generating cross-system commands that may be sent to another managed computer management system.

10. The computer program product of claim 9 wherein said code for generating comprises:
    code for generating said documentation containing identification of at least the event and the corresponding management actions triggered by the rule upon occurrence of the event.

11. The computer program product of claim 9 further comprising:
    code for generating a highly-structured representation of the user-defined rules from an implementation of the rules within a database, wherein said code for receiving comprises code for receiving said highly-structured representation of the user-defined rules.

12. The computer program product of claim 9 wherein the event comprises a system message from the managed computer system.

13. The computer program product of claim 9 further comprising:
    code for storing the generated documentation to computer-readable medium.

14. The computer program product of claim 13 wherein the generated documentation is contained in a computer-readable file.

15. The computer program product of claim 9 further comprising:
    code for outputting the generated documentation.

16. A computing system for generating documentation describing user-defined rules for computer system management having a programmable processor, memory and mass storage, the computing system comprising:
    a database storing user-defined rules that specify management actions to be triggered, for managing a computer system, responsive to receipt of a system message from the managed computer system; and
    a documentation generation device configured to autonomously generate documentation describing the rules, wherein the documentation contains identification of at least the system message and the corresponding management actions triggered by the rules upon receipt of the system message;

wherein the documentation generator device comprises an autoaction database containing patterns specifying messages desired to be identified and corresponding autoactions to be taken; and user defined rules comprising message matching criteria used in comparing patterns with messages; and the corresponding autoactions to be taken comprise raising alerts to a console associated with the computer management system, activating paging devices external to the computer management system, and generating cross-system commands that may be sent to another managed computer management system.

17. The computing system of claim 16 further comprising:

a database utility device configured to generate a highly-structured representation of the user-defined rules from the rules stored in the database, wherein the documentation generation device is configured to process said highly-structured representation of the user-defined rules to autonomously generate said documentation.

* * * * *